Feb. 1, 1955  H. G. STRONG  2,701,097
COMBINED SPEEDOMETER AND GASOLINE MILEAGE INDICATOR
Filed April 16, 1952  4 Sheets-Sheet 2
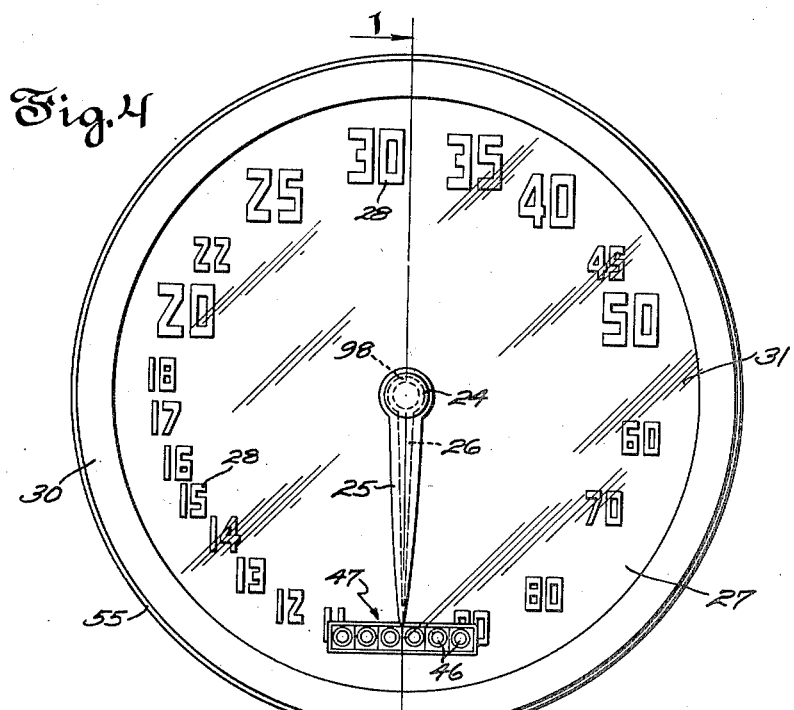
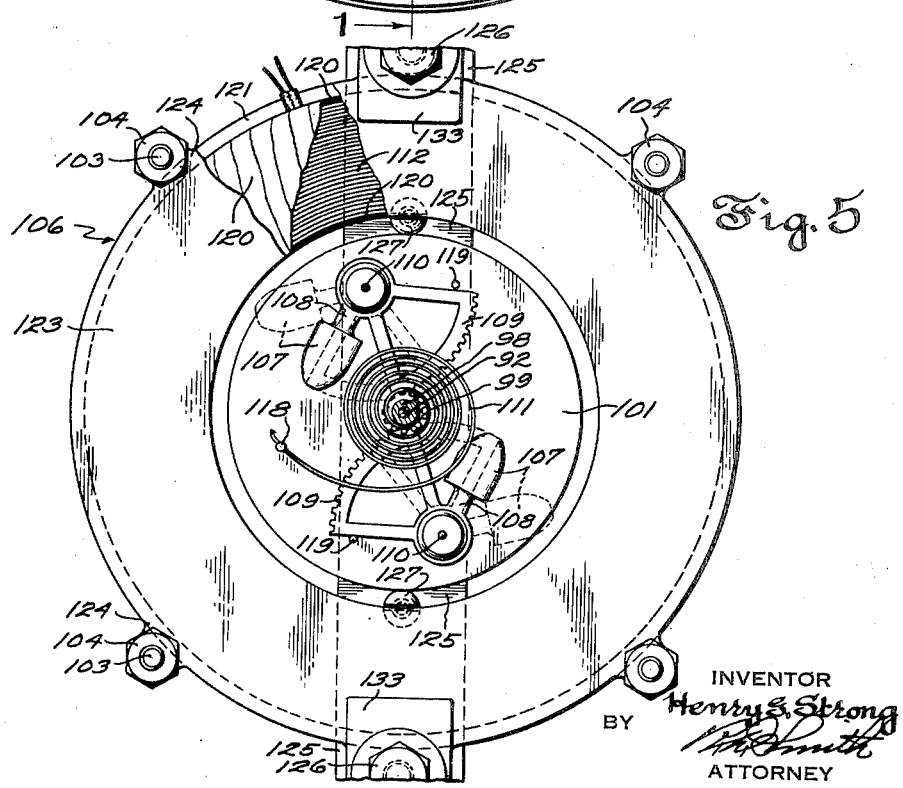
INVENTOR
Henry G. Strong
BY
ATTORNEY

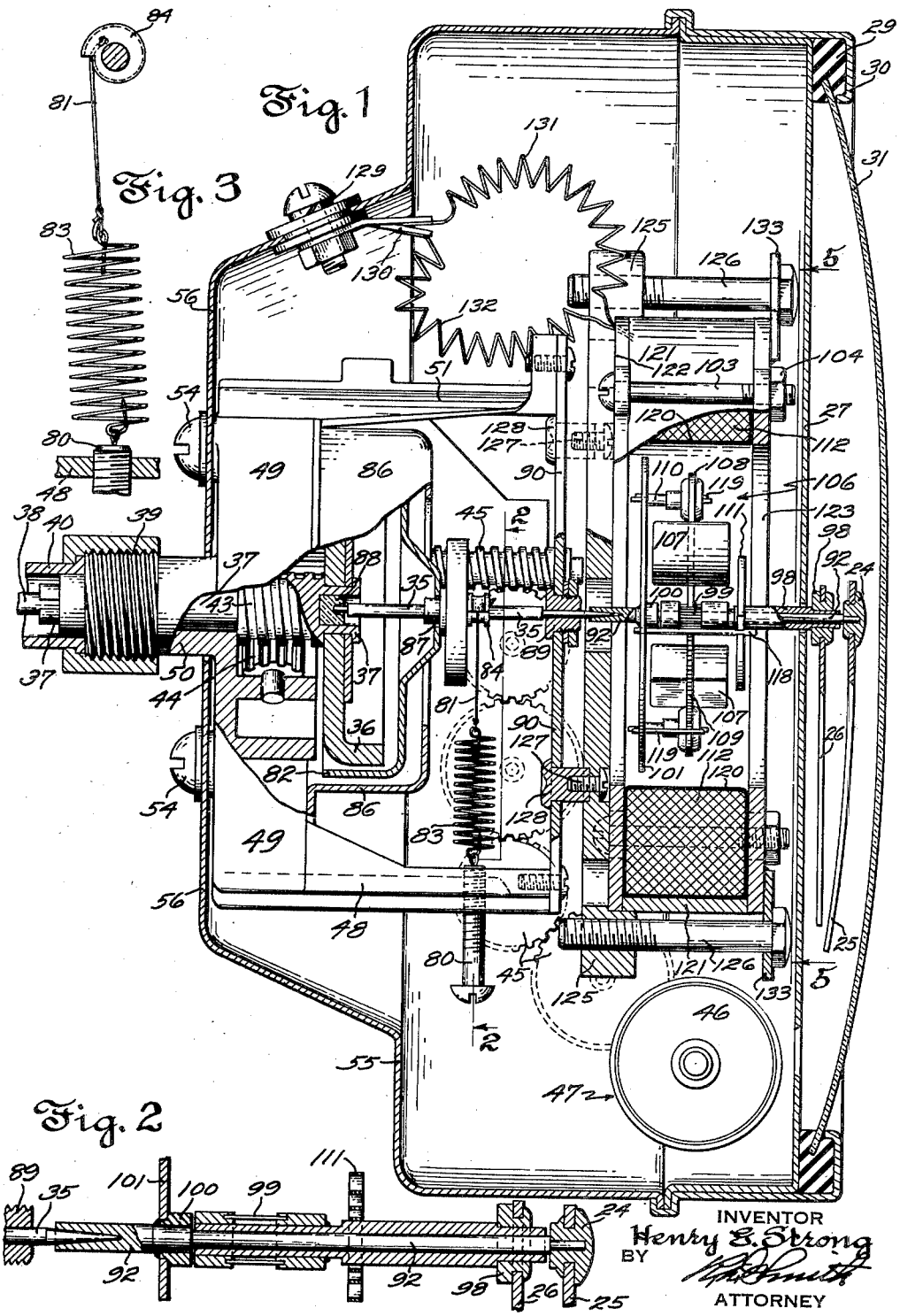

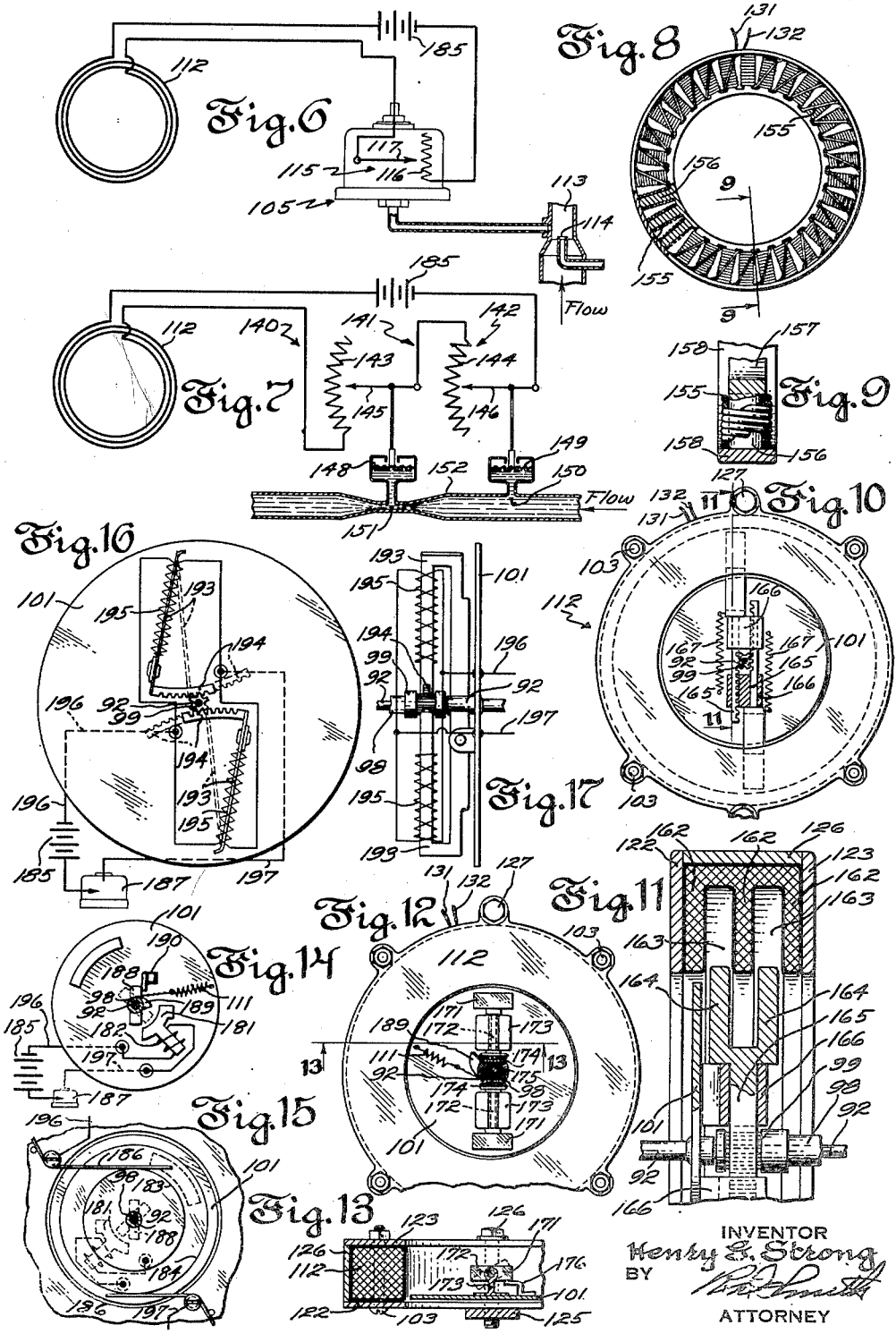

Feb. 1, 1955　　　　H. G. STRONG　　　　2,701,097
COMBINED SPEEDOMETER AND GASOLINE MILEAGE INDICATOR
Filed April 16, 1952　　　　　　　　　　　　4 Sheets-Sheet 4

INVENTOR
Henry G. Strong
BY
ATTORNEY

United States Patent Office 2,701,097
Patented Feb. 1, 1955

2,701,097

COMBINED SPEEDOMETER AND GASOLINE MILEAGE INDICATOR

Henry G. Strong, Fayetteville, N. Y.

Application April 16, 1952, Serial No. 282,659

20 Claims. (Cl. 235—61)

This invention relates to measuring and indicating systems incorporating a unitary, value indicating instrument wherein differential rotary movement between two coaxial indicators enables one of the indicators to assume positions angularly displaced relatively to the other indicator about a common pivotal axis for registering at any time a value reading different from that registered by the other indicator. The displaceable indicator can appropriately be termed an auxiliary or floating indicator because its angular departure from the main indicator is possible at any of the various indicating positions which the main indicator can assume and is quantitatively independent thereof.

One example of a floating auxiliary indicator so operating is disclosed in my copending application, Serial No. 733,539, filed March 10, 1947, now Patent No. 2,593,628 on April 22, 1952, wherein the main indicator comprises the ordinary speed indicating pointer of an automobile speedometer that registers the speed of travel of a vehicle in terms of miles per hour, while the auxiliary or floating indicator comprises a coaxially pivoted pointer that is angularly displaceable automatically from alignment with the speed indicating pointer. At each speed indication position of the main pointer, the auxiliary pointer will simultaneously register the power delivering efficiency of the vehicle engine in terms of miles being traveled by the vehicle per gallon of gasoline being consumed at that particular speed.

In my said copending application, angular displacement of the auxiliary pointer from the main indicating pointer is made possible by slippage between motion transmitting mechanisms. Such slippage involves relative sliding movement between mutually touching mechanical parts. This incurs friction which even though small is undesirable in instruments operated by delicate forces.

An object of the present improvements is to eliminate frictional resistance by reducing or doing away entirely with rubbing contact between relatively slidable mechanical surfaces.

A contributory object of the invention is to transmit angular displacing forces to the auxiliary or floating pointer through power imparted thereto by electrically energized instrumentalities.

A more specific object is to transmit power for displacing the auxiliary pointer from the main pointer by means of an electrically energized prime mover that is structurally united with the main pointer in a manner to travel at least in part bodily therewith.

A further object is to modulate the strength of an electric current by which such prime mover is energized in finely graduated accordance with every change in the rate of flow of gasoline or other liquid fuel passing from the float chamber of an automobile carburetor to the mixture forming jet thereof.

One of many possible practical embodiments of the invention is illustrated herein in the form of a metering system incorporating an electric circuit and a unitary indicating instrument capable of registering, in part through power conveyed by said circuit, a plurality of values commensurate with changing rates of motion at different sources of motion. In the illustrated embodiment one such source of motion is the running gear of an automobile or other motor vehicle, while the other source of motion resides in pressure changes which result from changes in the rate of flow of a fluid. The fluid may be an atomizing stream of air or a conduit conducted liquid fuel drawn by the suction of said air through the carburetor throat of an internal combustion engine by which the vehicle is powered.

The invention is not limited in its useful application and scope to the separate measuring and joint registering of changes in rates of motion occurring at separate sources of motion, but as claimed hereinafter is subject to use for simultaneously registering a plurality of values commensurate with changing conditions of other kinds at different sources of motion, as for instance the variations of surface level of stored liquid being drained from or delivered to a tank or the variations in weight of a substance being depleted or accumulated.

The above mentioned objectives will be become clear in greater particular from the following description of one successful embodiment of the invention which description has reference to the accompanying drawings wherein:

Fig. 1 is a view taken partially in central vertical section on the plane 1—1 in Fig. 4 through a unitary indicating instrument serving to illustrate the invention.

Fig. 2 is an enlarged fragmentary view of coaxial driving mechanisms for the pointers of the instrument shown in section on the plane 2—2 in Fig. 1.

Fig. 3 is an enlarged detail of a cam collar viewed from the section plane 3—3 in Fig. 1 and used to convert pointer return torque to logarithmic values.

Fig. 4 is a front view of the instrument face looking from the right at Fig. 1.

Fig. 5 is a view taken in section on the plane 5—5 in Fig. 1 looking in the direction of the arrows, showing the electrically energized prime mover that independently motivates the auxiliary pointer.

Fig. 6 is a schematic representation of an electrical system capable of converting variations in rate of fluid flow into corresponding variations in strength of electric current by which the prime mover of Fig. 5 is energized.

Fig. 7 is a schematic representation of a modification of the electrical system shown in Fig. 6 sensitive to flow of liquid instead of air as a source of motion to be metered.

Fig. 8 shows a modified construction of electromagnetic field coil.

Fig. 9 is a fragmentary view taken in section on the plane 9—9 in Fig. 8.

Fig. 10 is a view like Fig. 5 showing a modified driving mechanism for the auxiliary pointer motivated by a modified form of electromagnetic field and armature arrangement.

Fig. 11 is an enlarged view taken in section on the plane 11—11 in Fig. 10.

Fig. 12 shows a still different form of magnetic armature and auxiliary indicator motivating mechanism responsive to a stationary electromagnetic field coil.

Fig. 13 is a view taken in section on the plane 13—13 in Fig. 12.

Fig. 14 shows a form of the invention wherein the entire electrically energized prime mover floats in unison with the main indicator.

Fig. 15 shows a modified method of furnishing electric current to the prime mover of Fig. 14.

Figs. 16 and 17 are respectively front and side views of an electrically energized prime mover incorporating a heat motivated thermostat.

Figure 18:
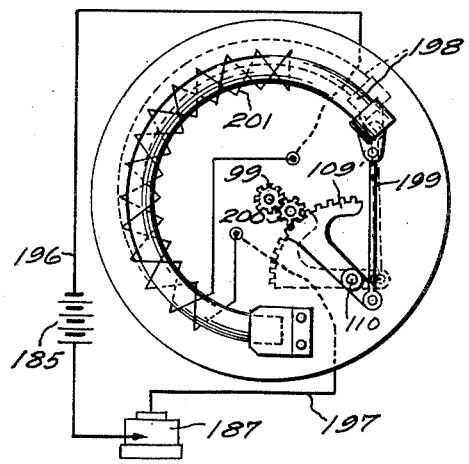
Figs. 18 and 19 are views respectively similar to Figs. 16 and 17 showing a modification wherein a Bourdon tube is substituted for bimetallic thermostats.

In those embodiments of the improvements herein chosen to illustrate the invention both the speed of the vehicle and the efficiency of operation of its power engine can be registered simultaneously on the same dial of a single unitary indicating instrument that is intended to replace the conventional speedometer on the instrument panel of a passenger automobile, bus, truck, locomotive, or other vehicle. This aspect of the invention follows general principles which are set forth in fuller detail in my aforesaid Patent No. 2,593,628, wherein, as in the present invention, movement between a speedometer pointer 25 and an efficiency value indicating pointer 26, both coaxially mounted to sweep over a common logarithmic scale of indicia 28 on a stationary chart 27, can indicate on such common single scale the rate of liquid fuel consumption in terms of miles traveled by the vehicle per gallon of gasoline or other liquid fuel being consumed, simultaneously with the registering on the same common single scale of the rate of vehicle travel in terms of miles per hour.

In the structure of the instrument shown in Figs. 1 and 2, 35 and 92 represent end-to-end separable sections of a composite spindle serving to motivate said rotary speedometer pointer 25. The latter sweeps angularly over the circular scale of indicia 28 on a stationary chart 27 responsively to variations in the unidirectional rotary speed of a magnetized rotor 36 in keeping with conventional speedometer practice. Rotor 36 is driven at a speed constantly proportioned to that of the driving gear of an automotive vehicle by connections that are only scantily represented in Fig. 1 and wherein a stub shaft 37 and its detachable flexible driving cable 38 are coupled together by the separable joint 39 in a cable housing conduit 40 thereby to rotate in unison.

In addition to rotor 36, shaft 37 carries fixed thereon a driving worm 43 which meshes with a gear 44 of a speed reduction train 45 which imparts progressive rotary motion to number wheels 46 in the accumulative register 47 of a conventional mileage counter. The gear members of reduction train 45 have rotary support on a frame bracket 48 that is mounted fixedly on the gear housing 49. The latter includes a bearing 50 in which stub shaft 37 is journaled. Also fixed on gear housing 49 by screws 54 or otherwise is the flat rear wall of an overall casing 55 which may be drawn to cup form from sheet metal and stepped down in diameter to provide the annular flat wall 56.

For automatically measuring the rotary speed of the vehicle driven magnetized rotor 36 a speed senser 82 fixed on rotatable spindle 35 flanks and cups about the vehicle driven rotor 36 in sufficient proximity thereto to be urged magnetically to turn various distances, usually less than a full revolution, in the direction armature shell 36 is rotating. Thus 82 may be regarded as a metering device responding to changes in rate of motion at one source of motion illustrated by the vehicle driven rotor 36.

This magnetic urging of senser 82 to turn may be opposed by the yielding resistance of a spiral spring as shown in Fig. 1 of my aforesaid copending application, or as another way of offering predetermined differences of torque resistance to successive increments of turning movement of spindle 35, which varying resistance may be in calibration with logarithmic values of the spacings of indicia 28 on dial 27, a cam collar 84 may be fixed on the same spindle 35 which carries the speed senser 82. Collar 84 has the peripheral contour shown in Fig. 3 whereby to serve as a cam-shaped winding drum whose angularly sequential radii about its axis of turning movement accord respectively with logarithmic functions or algebraic progressions. The end of a light duty spring coil 83 is connected to collar 84 by a very flexible band or thread 81 in a manner to cause the latter to be wound about such collar as spindle 35 is turned clockwise in Fig. 3 by the magnetically urged senser 82, and reversely to unwind from collar 84 as decrease in the strength of the magnetic urge on senser 82 releases collar 84 to the indicator returning pull of spring 83. The lower end of spring coil 83 is anchored to a screw 80 threading into frame bracket 48 which is rigid with the gear housing 49. A stationary cap housing 86 shelters the speed senser 82 and aids in its magnetic response to rotor 36 and is fixed in removable relation to gear housing 49. Cap housing 86 contains a central aperture 87 affording clearance for the spindle 35 to extend freely therethrough. Spindle 35 has a rear end of reduced diameter pivoted antifrictionally in a jewel bearing 88 embedded in a socket in the front end of stub shaft 37. Tension in spring 83 is adjusted by turning screw 80.

A first driving mechanism impellingly associating speed senser 82 with the main value indicator or speed indicating pointer 25, includes the reduced front extension 92 of spindle 35. Spindle 35 is journaled to turn freely in a bearing 89 lodged fixedly in a crosswise extending frame bar 90 that is fastened removably on frame bracket 48 and on a diametrically opposite frame bracket 51 similarly rigid with housings 49 and 86. The front extremity of spindle 35 is tapered and has tightly sleeved thereon to turn always in unison therewith the aforesaid coaxially aligned spindle extension 92 whose reduced front end 93 carries fixed thereon the hub 24 of speed indicating pointer 25. Miles per hour indicating pointer 25 is coaxial with the auxiliary value indicator or miles per gallon indicating pointer 26, which latter swings around directly at the rear thereof.

Pointer 26 is fixed on a hub 98 that is free to rotate on and relatively to the spindle extension 92. Sleeved fixedly on hub 98 is a lantern pinion 99 that also is freely rotatable therewith relatively to spindle extension 92. Endwise thrust for the hub 98 and pinion 99 is afforded at the front end of the former by the hub 24 of the main pointer 25 and at the rear end of pinion 99 by the mounting hub 100 of a carrier member 101. This member is in the form of a disc whose hub 100 is fixed on spindle extension 92 and turns in unison therewith. Hub 98 and pinion 99 are components of a second driving mechanism for independently impelling auxiliary pointer 26, and are additional to the before mentioned first driving mechanism comprising spindle 35, 92 etc. serving to impel main pointer 25.

According to the principles of this invention carrier member 101 serves to support bodily, at least in part, an electrically energized prime mover 106 that is a component of power transmitting instrumentalities serving to operably associate the driving mechanism 99, 98 of the auxiliary pointer 26 with metering devices designated 105 in Fig. 6. Whereas the first mentioned metering device 82 responds magnetically to changes in the rate of motion of the vehicle driven rotor 36, these second metering devices 105 include an electric current controller that is operatively sensitive to changes in the rate of motion or flow of a fuel fluid at the jet of a carburetor that forms the fuel mixture.

A form of electrically energized prime mover 106 that is not in its entirety bourne by the carrier member 101 is shown in Figs. 1 and 5. In order to avoid conducting electric current to a bodily movable electrically energized prime mover that follows or floats in its entirety with the speed registering movements of main pointer 25, prime mover 106 is supported only in part on carrier disc 101. Hence only parts of it revolve bodily in unison with pointer 25.

The floating parts of this prime mover include magnetically attractable similar armatures 107, 107 which are permanent magnets carried respectively on bell crank arms 108, 108 of gear segments 108, 108, both of which segments are constantly in mesh with the lantern pinion 99 of the driving mechanism for the auxiliary pointer. The north pole of each magnet 107 faces the observer in Fig. 5. The south pole is the rear or opposite face. Gear segments 108, 108 are swingably mounted on pivot studs 110, 110, respectively, which are fixed on carrier disc 101 so that the segments are free to swing thereon in response to magnetic pull on armatures 107, 107 exerted in a direction radial to spindle 92. This pull urges segments 108 clockwise in unison in Fig. 5 which urges lantern pinion 99 counterclockwise. Similar parts of the armatures and gear segments are located on common diametral lines intersecting the axis of rotation of carrier disc 101 so as always to distribute their weight in even counterbalancing manner in all of the changeable rotary positions of carrier disc 101.

Instead of being magnetically pulled or attracted outwardly toward field winding 112, as will be the case if armatures 107 are permanent magnets having north and south poles located as described, such armatures can be magnetically pushed or repelled inwardly away from field winding 112 by reversing the direction of current flow therethrough. This will call for the provision of direction reversing gears between segments 108 and lantern pinion 99 in order to leave unchanged the direction of movement of main pointer 25. If such reversing gears are not provided, the instrument will perform and register the product of the mathematical function of multiplication instead of division just as in my U. S. Patent No. 2,593,628 would occur if the helical slots (100) in said patent were to be given a reverse direction of pitch. One possible advantage in repulsion of the armatures 107 is that diminishing forces of magnetic power will be imparted thereto as the armatures swing farther away from the field coil, this being in conformity with the desired characteristic of counterclockwise movement of auxiliary pointer 26, namely that it shall move decreasing increments of distance to accord with diminishing spaces between successive graduation marked on the slidable scale of a conventional computing logarithmic slide rule, all as explained in my aforesaid copending application.

The remainder of the prime mover 106 comprises a stationary annular winding 112 of electrical conductive wire which sets up a ring-like stationary magnetic field all about and encompassing the circular path of armatures 107 in which field the latter, together with their respective segments 108, can revolve bodily in unison with carrier disc 101. At all points in the circular extent of this stationary field the radially outward magnetic pull thereof on armatures 107, 107 at any given instant is equal, but the magnetic force throughout the stationary annular field is varied simultaneously with the raising or lowering of the strength of electric current flowing through the field coil 112.

Coil 112 may consist of 277 turns of #22 B & S gage enamelled copper wire possessing a total resistance of 2½ ohms. Such wire may be wound on a mandrel which is afterward removed. The circular ring-shape and rectangular cross sectional body shape of the coil is maintained by a wrapping of heavy insulative tape 120. The whole is partially encased by a ring barrel 121 of soft steel or iron and flanked by flat ring plates 122, 123 of soft steel or iron. Barrel 121 and plates 122, 123 are believed not to be essential but should help to intensify the magntic field.

For holding the before described coil parts together as a self-contained unit, each of the ring plates 122, 123 is equipped with four edgewise projecting aligned ears numbered 124 on plate 123 and numbered 124' on plate 122. The bolts 103 extend through ears 124 and thread into ears 124' thus clamping the ring plates fixedly against the side faces of the wrapped winding 112 and against the edges of ring barrel 121 to help close a path for magnetic lines of force generated by the coil. Ring plate 123 carries two diametrically opposite brass lugs 133 which extend beyond the outer edge of the plate and through which fastening bolts 126 extend and reach into threaded engagement with a supporting brass spider 125 forming a coil centralizing rabbet which ring plate 122 fits in a manner to be held firmly seated against the spider.

Spider 125, itself, is removably secured to the aforesaid brass frame bar 90 by means of fastening screws 127 threading into studs 128 fixed in the frame bar. The avoidance of ferrous metals in spider 125 and frame bar 90 will avoid local interruption of uniform intensity of the annular electromagnetic field all about the circle. Electric current is lead to and from the field winding 112 from instrument binding posts 129, 130 by lead wires 131, 132, respectively. A supply potential of six volts will suffice.

In a coil of the specifications above given I obtain successful results by making armatures 107, 107 permanent magnet blocks about .362" long as viewed in Fig. 1 and measuring about .255" by .225" as viewed in Fig. 5. The tapering of the free edge of the armature block to a wedge shape as shown in Fig. 5 makes the contour of the side surface of the block convex to suit the concave curvature of the field coil wherefore the magnetic air gap between them approximates a space of constant dimension in respect to the whole side surface of the block. The inside diameter of the ring barrel 121 may be 1½".

Hub 98 of auxiliary pointer 26 and hence lantern pinion 99 which is united therewith are constantly urged in a clockwise direction in Fig. 5 by a spiral spring 111 having one end anchored to said hub and the other end anchored to post 118 fixed on and projecting from carrier disc 101. The characteristics of this spring may be like that of the hereinbefore mentioned return spring, shown in Fig. 1 of my copending application, in its ability to cause the magnetically impelled swinging movements of segments 108 to be in calibration with logarithmic values. Or to this end there may be substituted for spiral spring 111 on carrier disc 101 the same kind of return spring arrangement for lantern pinion 99 and the auxiliary pointer 26 as consists of the parts 81, 83 and 84 hereinbefore described wherein the cam collar 84 will be carried by hub 98, and the spring coil 83 acting thereon will be anchored to the carrier disc 101. A stop 119 fixed in carrier disc 101 limits the counterclockwise swinging movement of each segment 108 at a point where its armature 107 is maintained always in the operative magnetic field of the coil 112.

To complete a protective enclosing structure for the instrument a peripheral rubber ring gasket 114 is held against the front face of the chart 27 by a circular channel piece 29. The edges of a transparent crystal or circular window glass 31 are embedded in the soft material of gasket 114 which affords a seal against dirt and a shock absorptive mounting for the crystal.

The strength of current traversing field coil 112 is automatically varied at a remote point near the engine of the vehicle in accordance with changes taking place in the rate of flow of gasoline through the carbureter jet 114. This is done by a current controller that includes a variable rheostat 115 comprising a winding 116 of insulated resistance wire. Along bared spots on adjacent convolutions of the wire a voltage selector arm 117 is moved automatically by conventional linkage connection to a pressure sensitive diaphragm (not shown) located in the housing of a flow metering device 105. Pressure on the diaphragm in housing 105 is varied in accordance with the force of partial vacuum produced in the carbureter throat 113. This force will be proportional to the rate of flow of gasoline being delivered through the jet 114 to the fuel mixture. Since the art of deriving instrument motivating forces from changes in hydraulic or hydrostatic pressure produced by changes in rate of fluid flow is a common and well known practice, it is unnecessary to an understanding of the present invention to explain the flow metering device 105 in any greater particular.

The operation can be described with reference to a typical example of use of the invention as a combined speedometer and engine efficiency metering system and instrument wherein the driver of a motor vehicle can at any time observe the instrument face as it appears in Fig. 4 to determine at a single glance toward a single scale of indicia both the speed at which the vehicle is traveling and the rate of gasoline consumption taking place at that particular speed of travel.

If the vehicle is standing still and the engine is not running, both main pointer 25 and auxiliary pointer 26 will be at rest pointing at zero as in Fig. 4, the auxiliary pointer being covered and concealed behind the main pointer. When the engine is started and a consumption of gasoline is taking place, the selector arm 117 will be moved to reduce the resistance in rheostat winding 116 in Fig. 6 so that an increase of current electrically energizes the field coil 112 in the instrument of Figs. 1 and 5. This exerts a pull on the magnetic armatures 107 which will swing the gear segments 109 clockwise about their pivots 110. This displaces the auxiliary pointer 26 in a counterclockwise direction in Fig. 4 leaving the main pointer 25 where stationed. In my aforesaid copending application there is provided a second scale of indicia with which the auxiliary pointer can register in the situation just described thereby to indicate a measured consumption of gasoline even when the engine is idling and the vehicle not in motion, but such feature does not particularly concern the present improvements.

If the vehicle is now started and accelerates to a speed of around 30 miles per hour, the main pointer 25 will be moved clockwise into register with the indicium "30" on the shaft 27 and the carrier disc 101 will turn in unison therewith a corresponding extent, or nearly 180 degrees.

If at this vehicle speed of 30 miles per hour the rate of consumption of gasoline by the engine is 2 gallons per hour, segments 107 will assume an angular position about their pivots 110 that will cause the auxiliary pointer 26 to be displaced counterclockwise or backwards from the main pointer 25 an angular distance such that the auxiliary pointer registers with the indicium "15" while the main pointer registers with the indicium "30."

Thus at a glance at a single series of indicia on an instrument face or chart the driver of the vehicle can tell at any time both the speed at which he is traveling and the rate of consumption of gasoline at that speed in terms of miles being traveled by the vehicle per gallon of gasoline being consumed.

As in my aforesaid copending application the accumulated miles traveled by the vehicle can be read at all times by observing the number wheels 46 through an opening in the face or chart 27 of the instrument.

In Fig. 7 a modification of the metering devices of Fig. 6 is schematically shown wherein the current controller 140, used in place of controller 105, includes two variable rheostats 141 and 142, electrically connected in series as shown. Rheostats 141 and 142 include separate windings of resistance wire 143 and 144, respectively, from which windings selector arms 145, 146 take off varying strengths of current to be fed to the electromagnetic coil 112 of the indicating instrument of Fig. 1. Each of the selector arms is mounted at one end to swing about a fixed pivot and is actuated by push-pull connection to a diaphragm. Diaphragm 149 is constantly subject to the relatively high pressure of slow flowing gasoline or other fuel oil at the unconstricted location 150 in conduit 152 leading to the carbureter, while diaphragm 148 is simultaneously subjected to the relatively low pressure of fast flowing gasoline at the constricted location 151 in conduit 152. The differential in pressures at locations 150 and 151 increases as the total flow of gasoline through conduit 152 increases wherefore selector arm 145 moves downward and selector arm 146 moves upward reducing the aggregate length of resistance wire in coils 144, 145 through which current must travel, and thus stepping up the strength of current that will traverse the electromagnetic coil 112 when gasoline is flowing to the vehicle engine and being consumed at a faster rate. The magnetic armatures 107 will be motivated to swing auxiliary pointer counterclockwise commensurate distances thus to indicate less and less miles per gallon efficiency of the engine performance for any given speed of engine performance. If the instrument is used where alternating current is available for energizing electromagnet coil 112 of the prime mover, the strengths of such alternating current can be modulated in direct response to changes in rate of liquid fuel flow by metering devices of the class shown in U. S. Patent No. 2,583,724 granted to R. A. Broding.

If it is desired to utilize magnetic repulsion instead of magnetic retraction to motivate the armatures 107 it is only necessary to reverse the direction of current flow through the winding of coil 112 and introduce a speed changing idler gear between and in mesh with the lantern pinion 99 and each of the gear segments 109 so that in the position of the auxiliary pointer 26 shown in Fig. 4 the armatures 107 will assume their broken line position in Fig. 5 in which position they may be arrested against further movement in an outward direction by a suitably provided stop.

Figs. 8 and 9 show a modified construction of the magnetic field coil wherein a continuous length of the enamel insulated conductive wire 155 is wound about spokes 156 of ferrous material outstanding radially from and integral with ring 157 of ferrous material, the turns of wire about each spoke being in electrical series. An outer ring 158 of ferrous material may then surround the radial outer ends of the spokes in contact therewith. The two rings 157, 158 contribute to a distribution of the magnetic flux evenly about the circle of the rings to avoid concentrations of flux strength at particular locations such as constitute definite north or south field poles in a dynamo-electric machine.

In Figs. 10 and 11 a still differently modified form of magnetic coil is made by winding the enamel insulated conductive wire 162 on a mandrel in a manner to approximate the cross sectional area of the coil 112 in Fig. 1 except that spaced annular channels 163 are formed into which there may be drawn by magnetic attraction a forked armature 164 of ferrous material which forms the terminal of a rack bar 165 that is slidably guided in bearings 166 fixed on the carrier disc 101 so that the gear teeth of rack bar 165 ride constantly in mesh with the lantern pinion 99. Two such sets of rack bars, armature forks and bearings disposed symmetrically on the carrier disc 101 will serve to counterbalance each other. A spring 167 may be applied to constantly urge the rack bars into their positions shown in Figs. 10 and 11 wherein they are stopped by the abutment of armature fork against the end of the slide bearing 166. Increasing strength of current in the coil of Figs. 10 and 11 will attract the armature forks 164 radially outward like the plunger in a solenoid with respect to the axis of pinion 99 and thus rotate pinion 99.

In Figs. 12 and 13 the same electromagnetic coil 112 is shown as appears in Fig. 1 but the armatures consist of permanent magnets 171 each having a north pole at one end and a south pole at the other end which magnets are free to turn about an axis extending diametrically of the coil and intersecting the axis of spindle 35 and 91. Each of armature magnets 171 is fast on one end of a shaft 172 that is freely rotatable in a bearing 173 fixed on the carrier disc 101. The opposite end of shaft 172 carries fixed thereon a bevel gear 174 which is constantly in mesh with a bevel gear 175 fast to the hub 98 of the auxiliary pointer 26 which bevel gear may replace the lantern pinion 99. The lines of magnetic force exerted by the field coil 112 are such that permanent magnets 171 will be turned about the axis of shaft 172 an angular extent that accords with the strength of current in field coil 112 and with sufficient torque force to overcome the pull of return spring 111. A stop 176 establishes a normal rotary position for each magnet block when auxiliary pointer 26 is in alignment with the main pointer 25 and the current in field coil 112 is at a minimum.

In Figs. 14 and 15 an embodiment of the invention is shown wherein the entire electrically energized prime mover is carried on the disc 101 and consists of an electromagnetic field pole 181 carrying a coil of insulated conductive wire 182 whose terminals are relatively insulated collector discs 183, 184 respectively mounted on and in insulated relationship to the carrier disc 101. Current is furnished to these collector rings from a battery source 185 through spring leaf brushes 186. The current is modulated by such means as are shown in either of Figs. 6 or 7 at the location 187. This arrangement enables me to do away with linkages and gearing entirely since the permanent armature magnet 188 can be mounted fixedly on hub 98 of auxiliary pointer 26 and drawn rotatively and relatively to spindle 92 toward the point of maximum strength in the field pole 181 against the resistance of return spring 111 as current strength increases in winding 182. Conversion of magnetic torque into logarithmic values can result from use of the cam 189 fixed on hub 98 equivalent to cam collar 84 in Fig. 2. A stop 190 fixed on carrier disc 101 intercepts armature magnet 188 in its full line position wherein the main pointer 25 and auxiliary pointer 26 are brought into alignment when field pole 181 is demagnetized.

In Figs. 16 and 17 a familiar type of U-shaped bimetal strip 193 has one of its ends fixedly mounted on the spindle 35 thereby to swing in unison with the main pointer 25. The other end of the bimetal strip carries a gear tooth segment 194 operating as do the segments 109 in Fig. 5 with respect to the lantern pinion 99. The bimetal strips 193 with their gear segments 194 flex between broken and full line positions in Fig. 19 in accordance with rise or fall in temperature imparted thereto by a winding of resistance wire 195 carried on and insulated from the strips 193. Current is furnished to the winding 195 through flexible leads 196, 197 deriving current from a battery source 185 modulated by a metering device at location 187 as in Fig. 18. Since bimetal thermostats are self motivating in both directions of flexure, spring 111 may be omitted.

Figure 19:
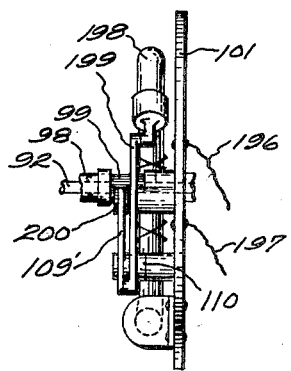

As shown in Figs. 18 and 19, in still another way of causing an extent of angular movement of auxiliary pointer 26 relative to main pointer 25 in measured accordance with changing rates of fluid flow, I may substitute a Bourdon tube 198 for the magnetically moved armatures of Fig. 5 herein. The Bourdon tube can be like that designated (26) in U. S. Patent No. 2,522,299 to Redue, Jr., except that it will constitute an isolated torus-shaped chamber filled with a fluid that is expansible by heat and its free or movable end can be linked by rod 199 to the gear segment 109' herein as it is linked by rod (25) to the gear segment designated (23) in said Redue patent said gear segment driving the pinion 99 through the medium of an idler pinion 200. It will be understood that the Bourdon tube 198, and the gear segment 109' and idler pinion 199 are mounted on the carrier disc 101 hereof rather than on a stationary frame as in the Redue patent. Such Bourdon tube can then be heated in measured accordance with changes in rate of a liquid flow by winding about it in insulated relation thereto a heater of resistance wire 201 similar to 195 in Figs. 16 and 17 herein.

The appended claims are directed to and intended to cover as many of the above described variations and equivalents of the preferred form of the invention as fall within the broadest fair interpretation of their language.

I claim:

1. A composite metering system for simultaneously registering a plurality of values commensurate with changing conditions at different sources of motion, comprising in combination with said different sources of motion, a unitary registering instrument including a main value registering indicator and an auxiliary value registering indicator, cooperative driving mechanisms in said instrument connected respectively to said indicators in such manner that one of said mechanisms is operative to cause only movement of both of said indicators in unison while the other of said mechanisms is operative to cause only movement of said auxiliary indicator relatively to said main indicator, a source of power supplying electric current, separate metering devices automatically responsive to changes in condition at said different sources of motion respectively, at least one of said devices including an electric current controller operatively sensitive to changes in condition at one of said sources of motion thereby to vary and determine the power supplied by said current in accordance with said changes in condition, and separate power transmitting instrumentalities operatively associating said indicator driving mechanisms with said metering devices respectively, at least one of said instrumentalities including an electrically responsive prime mover in said instrument operatively energized by means of said current and connected to motivate said auxiliary indicator driving mechanisms in accordance with variation in power supplied by said current to said prime mover.

2. A composite metering instrument as defined in claim 1, in which the said indicators comprise coaxially pivoted rotary pointers together with a stationary scale of value denoting graduations disposed to be swept in common by both of said pointers.

3. A composite metering instrument as defined in claim 1, in which the said prime mover is carried at least in part by one of the said indicator driving mechanisms and operatively related to the other of the said indicator driving mechanisms.

4. A composite metering instrument as defined in claim 1, in which the said prime mover includes an electromagnet carried at least in part by one of the said indicator driving mechanisms and operatively related to the other of said indicator driving mechanisms.

5. A composite metering instrument as defined in claim 1, in which the said prime mover includes a stationary winding of conductive wire arranged to generate a magnetic field, and an armature carried by and movable in relation to one of the said mechanisms within the magnetic influence of said field.

6. A composite metering instrument as defined in claim 1, in which the said prime mover includes stationary windings of conductive wire arranged to generate a magnetic field, and an armature pivotally mounted on one of the said mechanisms to be movable bodily therewith and swingable relatively thereto within the magnetic influence of said field, and motion transmitting gears operatively relating said armature to the other of the said mechanisms wherefore to cause relative movement between the said indicators.

7. A composite metering system as defined in claim 1, in which the said indicators are coaxially mounted to sweep over a common scale of indicia comprising logarithmic numerals spaced apart in graduated accordance with the respective logarithms of said numerals, together with means to influence the said power transmitted by the said instrumentalities into an extent of motivation of the said indicator driving mechanism proportional to the logarthmic value of rate changes metered by the said device.

8. A composite metering instrument as defined in claim 1, in which the said prime mover includes a stationary winding of conductive wire arranged to generate a magnetic field, and an armature slidably mounted on one of the said mechanisms to be movable bodily therewith and slidable relatively thereto within the magnetic influence of said field, and motion transmitting gears operatively relating said armature to the other of the said mechanisms in a manner to cause relative movement between the said indicators.

9. A composite metering instrument as defined in claim 1, in which the said prime mover includes stationary windings of conductive wire forming an annular channel flanked on opposite sides by said wire in a manner to generate a magnetic field within and throughout the annular length of said channel, and an armature carried by and movable in relation to one of the said mechanisms within the said channel.

10. A composite metering instrument as defined in claim 1, in which the said prime mover includes stationary side-by-side windings of conductive wire arranged to generate side-by-side separate annular magnetic fields, and a plurality of side-by-side armatures carried by and movable in unison in relation to one of the said mechanisms within the magnetic influence of said separate fields respectively.

11. A composite metering instrument as defined in claim 1, in which the said prime mover includes a winding of conductive wire carried fixedly by and in insulated relation to one of the said mechanisms adapted to generate a magnetic field, and an armature carried by and movable in relation to said one of said mechanisms within the magnetic influence of said field.

12. A composite metering instrument as defined in claim 1, in which the said prime mover includes a stationary annular winding of conductive wire arranged to generate a magnetic field, and a permanent magnet pivotally mounted on one of the said mechanisms to turn about an axis disposed in diametral relation to the annulus of said winding and located within the magnetic influence of said field, and motion transmitting bevel gears operatively relating said armature to the other of the said mechanisms wherefore to cause relative movement between the said indicators.

13. A composite metering instrument as defined in claim 1, in which the said prime mover includes a bi-metallic strip carrying a heater winding of resistance wire electrically connected to translate the said current and flexing responsively to heat supplied by said winding, and motion transmitting connections operatively relating said bimetallic strip to the other of the said mechanisms wherefore to cause relative movement between the said indicators.

14. A composite metering instrument as defined in claim 1, in which the said prime mover includes a Bourdon tube filled with a heat expansible fluid and carrying a winding of resistance wire electrically connected to translate the said current and flexing responsively to heat supplied by said winding.

15. A composite metering instrument as defined in claim 1, in which one of the said indicators comprises a main rotary pointer pivotally mounted to swing about a fixed axis, and the other of said indicators comprises an auxiliary pointer pivotally mounted to swing about said axis into and out of alignment with said main pointer in various rotary positions of the latter, together with a stationary scale of value denoting graduations disposed to be swept in common by both of said pointers.

16. A composite metering instrument as defined in claim 15, in which movement is imparted to the said auxiliary pointer by the said mechanism whose said power transmitting instrumentality includes the said prime mover.

17. A composite metering instrument as defined in claim 1, in which the said electrically energized means includes stationary windings of conductive wire arranged to generate an annular magnetic field, together with a carrier member moving in unison with one of the said mechanisms, a pinion carried fixedly by the other of said mechanisms, a gear toothed member in mesh with said pinion mounted on said carrier member to be mobile relatively thereto, and a magnetically attractable armature fixed to said gear toothed member in the influence of said magnetic field.

18. A composite metering instrument as defined in claim 17, in which there are two of the said gear toothed members both in mesh with the said pinion and mounted on said carrier member to be movable relatively thereto at diametrically opposite sides of the axis of revolution of said rotor in a manner to counterbalance each other's weight with respect to said axis, each of said gear toothed members carrying fixed thereto a magnetically attractable armature maintained within the influence of the said magnetic field.

19. A composite instrument for registering automatically and simultaneously both a main measurement and the quotient that results from dividing said main measurement by an auxiliary measurement, comprising in combination, a source of mechanical power commensurate with variation in said main measurement, a rotary main indicator, a first mechanism impellingly associating said source of power and said main indicator, a source of electrical power commensurate with variations in said auxiliary measurement, an auxiliary rotary indicator coaxial with said main indicator, a second mechanism bodily revolvable in unison with said main indicator impellably associating said auxiliary indicator with said main indicator whereby both of said indicators may be moved in unison by said mechanisms, an electromagnetic prime mover carried at least in part by said first mechanism in a manner to travel in unison with said main indicator, said prime mover being electrically energizable and operatively related to said second mechanism in a manner to cause said auxiliary indicator to be displaced relatively to said main indicator an extent determined by the strength of electrical energization of said electromagnet.

20. In a value metering and registering instrument, a pivotally mounted main value indicator, a pivotally mounted auxiliary value indicator, and a prime mover adapted to cause measured degrees of displacement between said indicators comprising means to generate an annular magnetic field in a fixed location surrounding the pivotal axes of said indicators, a rotary support united to turn in unison with one of said pointers, and a bell crank pivotally mounted on said support impellingly related to the other of said pointers including a magnetically responsive armature in said stationary field.

References Cited in the file of this patent

UNITED STATES PATENTS

| | | |
|---|---|---|
| 1,917,974 | Inglis et al. | July 11, 1933 |
| 2,250,739 | Ahlstrom | July 29, 1941 |
| 2,593,628 | Strong | Apr. 22, 1952 |

FOREIGN PATENTS

| | | |
|---|---|---|
| 126,182 | Australia | 1947 |
| 608,114 | Great Britain | Sept. 9, 1948 |